(12) United States Patent
Egli et al.

(10) Patent No.: US 9,174,401 B2
(45) Date of Patent: Nov. 3, 2015

(54) METHOD FOR PRODUCING A MULTILAYER DATA CARRIER AND DATA CARRIER PRODUCED BY SAID METHOD

(75) Inventors: Stefan Egli, Basel (CH); Heidi Widmer Gomres, Wahlendorf (CH)

(73) Assignee: Gemalto AG, Aarau (CH)

( * ) Notice: Subject to any disclaimer, the term of this patent is extended or adjusted under 35 U.S.C. 154(b) by 295 days.

(21) Appl. No.: 13/980,222

(22) PCT Filed: Jan. 13, 2012

(86) PCT No.: PCT/CH2012/000008
§ 371 (c)(1),
(2), (4) Date: Sep. 17, 2013

(87) PCT Pub. No.: WO2012/097463
PCT Pub. Date: Jul. 26, 2012

(65) Prior Publication Data
US 2014/0023838 A1    Jan. 23, 2014

(30) Foreign Application Priority Data

Jan. 18, 2011   (CH) .......................................... 86/11

(51) Int. Cl.
*B29D 17/00*   (2006.01)
*B32B 15/00*   (2006.01)
*B32B 23/08*   (2006.01)
*B42D 15/00*   (2006.01)
*B42D 25/41*   (2014.01)
(Continued)

(52) U.S. Cl.
CPC .............. *B29D 17/005* (2013.01); *B32B 15/00* (2013.01); *B32B 23/08* (2013.01); *B42D 15/00* (2013.01); *B42D 25/00* (2014.10); *B42D 25/29* (2014.10); *B42D 25/41* (2014.10); *B42D 25/43* (2014.10); *B41M 5/24* (2013.01); *B41M 5/26* (2013.01); *B42D 25/455* (2014.10); *B42D 25/46* (2014.10); *B42D 2033/04* (2013.01); *B42D 2033/10* (2013.01); *B42D 2033/30* (2013.01); *Y10T 428/24612* (2015.01); *Y10T 428/24868* (2015.01); *Y10T 428/24876* (2015.01)

(58) Field of Classification Search
CPC ...... B29D 17/005; B32B 15/00; B32B 23/08; B42D 15/00; B42D 25/41; B42D 25/43; B42D 25/29; Y10T 428/24848; Y10T 428/24876; Y10T 428/24612
See application file for complete search history.

(56) References Cited

U.S. PATENT DOCUMENTS 6,082,778 A    7/2000  Solmsdorf
6,358,596 B1 *  3/2002  Mehta et al. ................. 428/172
(Continued)

FOREIGN PATENT DOCUMENTS

CN    101556752 A    10/2009
CN    101594999 A    12/2009
(Continued)

*Primary Examiner* — Betelhem Shewareged
(74) *Attorney, Agent, or Firm* — The Webb Law Firm

(57) ABSTRACT

The invention relates to a method for producing a multilayer data carrier comprising a first layer which is made of plastic and has an upper face on which an opaque layer partially covering said upper face, for example a metal layer, is arranged. The data carrier has a second layer made of plastic which is disposed on the first layer and is transparent at least in a sub-region of the metal layer. The metal layer is partially removed by a laser to such an extent that the metal layer has at least one break. The metal layer is preferably laminated between the first and the second plastic layers.

24 Claims, 2 Drawing Sheets

(51) Int. Cl.
  *B42D 25/43*  (2014.01)
  *B42D 25/29*  (2014.01)
  *B42D 25/00*  (2014.01)
  *B41M 5/24*  (2006.01)
  *B41M 5/26*  (2006.01)
  *B42D 25/455*  (2014.01)
  *B42D 25/46*  (2014.01)

(56) References Cited

U.S. PATENT DOCUMENTS

| | | | |
|---|---|---|---|
| 8,603,615 | B2 | 12/2013 | Keller |
| 2002/0098422 | A1* | 7/2002 | Nozawa ............... 430/5 |
| 2007/0085337 | A1 | 4/2007 | Endres et al. |
| 2008/0136160 | A1 | 6/2008 | Leenders |
| 2009/0251749 | A1 | 10/2009 | O'Boyle et al. |
| 2010/0196587 | A1 | 8/2010 | Keller |
| 2011/0114731 | A1* | 5/2011 | Riedl ............... 235/487 |

FOREIGN PATENT DOCUMENTS

| | | |
|---|---|---|
| CN | 101790464 A | 7/2010 |
| DE | 4410431 A1 | 9/1995 |
| DE | 102007034716 A1 | 1/2009 |
| EP | 0159828 A1 | 10/1985 |
| EP | 0420261 A2 | 4/1991 |
| EP | 1501045 A1 | 1/2005 |
| EP | 1691989 A0 | 6/2005 |
| EP | 2109014 A1 | 10/2009 |
| EP | 2420261 A1 | 2/2012 |
| RU | 2466030 C2 | 11/2012 |
| RU | 2483934 C2 | 6/2013 |
| RU | 2491174 C2 | 8/2013 |
| RU | 2497684 C2 | 11/2013 |
| RU | 2501662 C2 | 12/2013 |
| RU | 2502606 C2 | 12/2013 |
| WO | 2005053968 A1 | 6/2005 |
| WO | 2009139800 A1 | 11/2009 |

\* cited by examiner

METHOD FOR PRODUCING A MULTILAYER DATA CARRIER AND DATA CARRIER PRODUCED BY SAID METHOD

TECHNICAL FIELD

The invention relates a method according to the preamble of claim 1.

In order to protect data carriers, for example identity cards, passports, driver's licenses, bank cards etc. having personalized data, security features are variously used. A very wide variety of security features for protecting the blank card without personalized data are known from the prior art. Often, however, it is the case that the forger does not forge a complete card but modifies or replaces the personalized data (photograph, date of birth, signature, name, etc.) on an e.g. stolen card. The protection of these personalized data is therefore very important. Techniques known from the prior art for protecting such data are, for example, the personalization of a second image in a lens structure, in such a way that the image is only visible at a particular observation angle. Another possibility for introducing a second image is to introduce a matrix image into the card by perforating the card. These production methods are relatively elaborate and require special devices during the card production (lens structure) or special machines for introducing the second image. The present invention provides a way in which the personalization can be protected in a straightforward way without additional machines.

PRIOR ART

EP 1 691 989 B1 discloses a data carrier which comprises a metal layer that is arranged between two translucent cover layers (light transmittance less than 10%). A "watermark" effect is intended to be created by ablation of the metal layer using a laser beam.

EP 2 109 014 A1 discloses a so-called overlay of laserable polycarbonate with a holographic layer on one side. The holographic layer can be metallized and partially ablated using a laser.

WO 2009/139800 discloses a security document comprising a metallized sheet, which is laminated surface-wide between transparent layers. A large part of the sheet is modified/printed in order to form the card background. A window of the sheet is left unmodified. After manufacture of the card, an image which is visible from the front side and rear side of the card is introduced into this window by means of laser ablation.

EP 0 420 261 relates to a method for producing a series of data carriers comprising holograms, in which the holograms are individualized by partial destruction or modification of the diffraction structures.

SUMMARY OF THE INVENTION

It is an object of the present invention to provide a method for producing a data carrier which is protected even better against unauthorized modifications. The data carrier is nevertheless intended to be produced economically. The object is achieved according to claim 1.

The invention relates in particular to a multilayer data carrier of thermoplastic (for example polycarbonate, PVC, PET-G). According to one refinement of the invention, a preferably metallized thin layer is applied partially onto one of the layers. This metallized layer may for example be vapor deposited, applied by hot stamping or laminated together with a carrier layer (for example PET) between two layers of the data carrier. The metallized layer is advantageously thinner than 4 µm, in the ideal case thinner than 1 µm. If it is laminated together with a carrier layer, the carrier should be no thicker than 50 µm, in the ideal case about 20 µm or thinner. The metallized layer may contain holographic diffraction structures. The metallized layer consists, for example, of aluminum, although other metals may be envisioned, for example titanium. The techniques for applying the metal layer onto a thermoplastic sheet are known to the person skilled in the art. The thermoplastic sheet is advantageously thicker than 50 µm, in the ideal case 100 µm or thicker.

The layer with the partially applied metal layer is then laminated together with the further layers of the cards to form a card body. In this case, the layer with the applied metal is covered with at least one further transparent layer. The layer onto which the metal is applied may be either transparent or opaque.

During personalization of the card, that is to say when writing the cardholder's data onto the card, the metal layer is then partially ablated, i.e. evaporated, using a laser. At the positions where the laser strikes the metal layer, the metal sheet evaporates and a recess is formed in the metal. Text or matrix images can therefore be written into the metal sheet using the laser. For this process, it is possible to use the same type of laser as is employed for the data carrier personalization known from the prior art (laser marking by means of blackening). It is, however, also possible to use a laser with a different wavelength.

When the metal layer is evaporated, the sheet below the metal layer is visible through the gap left in the metal sheet. Depending on whether this sheet is transparent or opaque, the image formed in the metal layer is optimally visible in transparent view (in the case of a transparent sheet) or direct view (in the case of an opaque sheet). Owing to the reflection behavior of the metal layer, the image can be seen in direct view as "positive" (dark) or "negative" (light) depending on the viewing angle.

According to a refinement of the invention, the sheet is printed in a color before application of the metal layer, so that the color is visible through the gaps in the metal layer after the ablation of the metal layer and provides a special effect.

According to a refinement of the invention, the metal layer is introduced or applied, respectively, onto or into a transparent window in the data carrier, so that the ablated image is visible in transparent view but the rest of the data carrier comprises an opaque core layer.

According to a refinement of the invention, a thin opaque plastic layer having a special additive is used instead of a metal layer, this additive modifying the opaque plastic layer during the exposure in such a way that it becomes transparent or at least translucent. The additive is, for example, a pigment which is destroyed during the exposure to a laser. Such pigments are known to the person skilled in the art. Instead of a pigmented plastic, it is possible to use a semicrystalline opaque plastic in which the macromolecules arranged in crystallites are converted into an amorphous and transparent structure by the heat input of the laser radiation.

The opaque plastic layer may, for example, be introduced into the card structure as a co-extruded sheet or as a separate sheet by the known techniques.

BRIEF DESCRIPTION OF THE DRAWINGS

Exemplary embodiments of the invention will be explained in more detail below with the aid of the drawing, in which.

DESCRIPTION OF PREFERRED EXEMPLARY EMBODIMENTS

Figure 1:
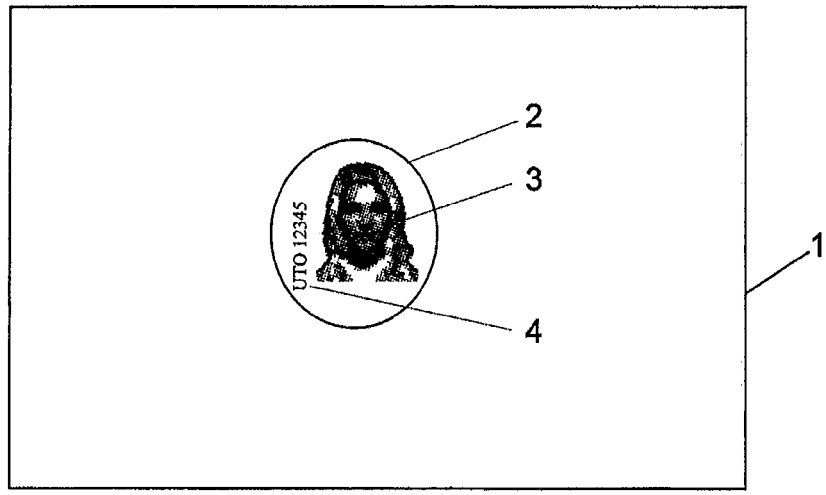
FIG. 1 schematically shows a plan view of a data carrier according to the invention
Figure 2:
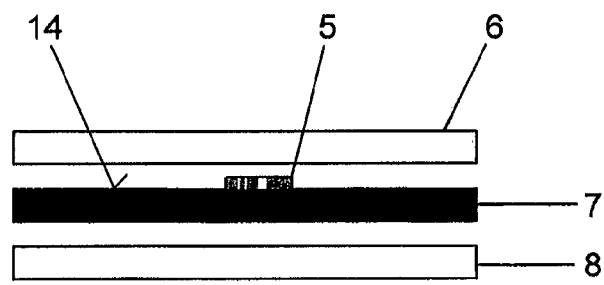
FIG. 2 shows a cross section through a data carrier according to the invention.

FIG. 1 shows a data carrier 1, which according to FIG. 2 comprises an opaque core sheet 7, a lower transparent cover sheet 8 and an upper transparent cover sheet 6. A metal layer is applied onto an upper side 14 of the core sheet 7, for example vapor deposited or applied by hot stamping. In what follows, a metal layer also refers to a metallized layer or a metallic layer. Such layers are known per se. They are relatively thin and have for example a thickness of 4 micrometers, preferably less than 1 micrometer. The metal sheet may also be formed as a hologram. The cover sheet 6, the core sheet 7 and the lower cover sheet 8 are bonded in a manner known per se by lamination. The metal layer 5 then correspondingly lies between the core sheet 7 and the cover sheet 6. Using a laser apparatus, the metal layer is removed in such a way that, for example, the ablated second image 3 and the ablated second text 4 are formed in FIG. 1. They are preferably formed by a recess in the metal layer 5. The opaque core sheet is visible through these recesses. Before the application of the metal layer, the opaque core sheet may be printed in the region of the metal layer or below the latter. The second image 3 and the second text 4 can then correspondingly be seen in a color hue. Then, the second text 4 therefore appears blue or red, for example.

Figure 3:
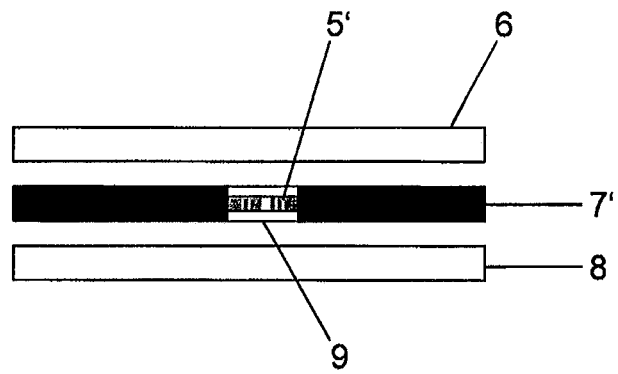
FIG. 3 shows a cross section through a data carrier according to the invention according to a variant.

The data carrier according to FIG. 3 has a core sheet 7', which comprises a transparent sheet 9 on which the metal layer 5' is applied, for example vapor deposited. The ablated regions are in this case visible from both sides, that is to say in FIG. 3 from above through the cover sheet 6 and from below through the cover sheet 8.

Figure 4:
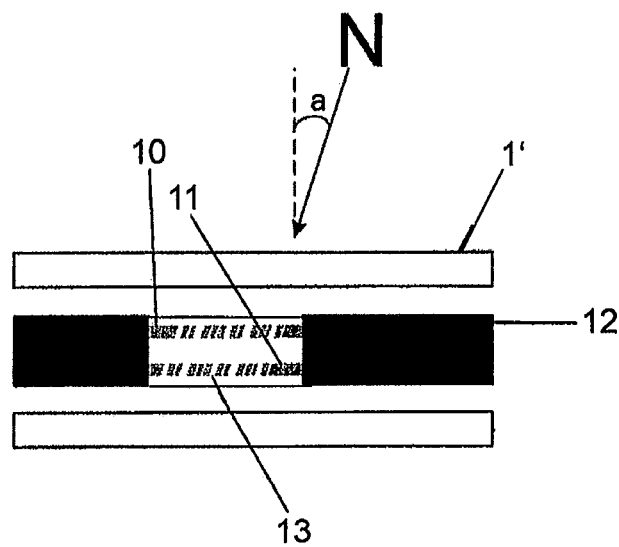
FIG. 4 shows a cross section through a data carrier according to another variant.

FIG. 4 shows a data carrier 1' which comprises a core sheet 12 that has a transparent sheet 13, which comprises a first metal layer 10 and a second metal layer 11. These metal layers 10 and 11 may likewise be vapor deposited or applied by hot stamping. These two metal sheets 10 and 11 are at a distance from one another of, for example, at least 50 micrometers or preferably 100 or more micrometers. During the ablation using the laser, as indicated, the data carrier 1' is placed obliquely at a predetermined angle A. The ablation takes place in the two metal layers 10 and 11. If, owing to the laser intensity, it is not possible to ablate the two metal layers 10 and 11 from the same side of the card, two matching laser processes may also be envisioned on the rear side and the front side of the data carrier 1'. In this case, the closer-lying metal layer 10 or 11 is respectively processed. By identical placement of the data carrier 1' before the laser processing, the lasered image is visible in transparent view only at the corresponding viewing angle. It is also conceivable to laser two different images with different angles from one another, and thus obtain a tilt effect between the two images, or the two metal layers 10 and 11, during observation at different angles. The core layer 12 may, as can be seen, be fastened and in particular laminated between two layers, or cover sheets.

LIST OF REFERENCES 1 data carrier
2 metal sheet
3 ablated second image
4 ablated second text
5 metal layer
6 cover sheet
7 opaque core sheet
8 transparent cover sheet
9 transparent sheet
10 first metal sheet
11 second metal sheet
12 core sheet
13 transparent sheet
14 upper side

The invention claimed is:

1. A method for producing a multilayer data carrier, said data carrier comprising:
 a first layer of plastic that comprises an upper side;
 an opaque layer that is arranged on said upper side of said first layer and partially covering said upper side; and
 a second layer of plastic which is arranged on the first layer and is transparent at least in a subregion of the opaque layer, wherein said method comprises:
  the step of partially removing the opaque layer using a laser until the opaque layer has at least one recess, or
  the step of producing the opaque layer from a material which is modified during the exposure in such a way that it becomes transparent or at least translucent in the exposed region.

2. The method as claimed in claim 1, wherein the opaque layer is laminated between the first and second plastic layers.

3. The method as claimed in claim 1, wherein the opaque layer is arranged in a window of the otherwise at least regionally opaque layer.

4. The method as claimed in claim 1, wherein the opaque layer is a metal layer.

5. The method as claimed in claim 1, wherein the data carrier is produced with at least two metal sheets arranged parallel above one another, and these two metal sheets are provided with recesses.

6. The method as claimed in claim 5, wherein the two metal layers are exposed vertically with respect to their plane or at an inclination with respect to their planes, so that the recesses extend vertically or at an inclination with respect to said planes.

7. The method as claimed in claim 5, wherein the at least two metal sheets are arranged at a distance from one another.

8. The method as claimed in claim 5, wherein the at least two metal sheets are arranged in a window of an opaque core sheet.

9. The method as claimed in claim 8, wherein the core sheet is laminated between two transparent sheets.

10. The method as claimed in claim 1, wherein the opaque layer is a plastic layer, which has an additive that modifies the plastic layer during the exposure to the laser in such a way that the opaque layer becomes transparent in the exposed region.

11. The method as claimed in claim 10, wherein the opaque plastic layer is at least 20 micrometers thick.

12. The method as claimed in claim 10, wherein the opaque plastic layer is exposed to the laser vertically with respect to its plane or at an inclination with respect to its plane, so that the recesses extend vertically or at an inclination with respect to said plane.

13. A data carrier produced according to claim 1, said data carrier comprising:
 a first layer of plastic that comprises an upper side;
 an opaque layer that is arranged on said upper side of said first layer and partially covering said upper side; and a second layer of plastic which is arranged on the first layer and is transparent at least in a subregion of the opaque layer.

14. The data carrier as claimed in claim 13, wherein it is an identity card, a page of a passport, a credit card or the like.

15. The data carrier as claimed in claim 13, wherein the opaque layer is a metal layer which is vapor deposited onto a sheet, applied by hot stamping or laminated together with a carrier layer.

16. The data carrier as claimed in claim 13, wherein the metal layer is thinner than 4 micrometers.

17. The data carrier as claimed in claim 13, wherein the case of two metal layers, they are at a distance from one another of at least 50 micrometers.

18. The data carrier as claimed in claim 13, wherein the opaque layer is produced from a plastic, and wherein the latter is transparent or translucent in an exposed region.

19. The data carrier as claimed in claim 13, wherein the opaque layer is produced from a pigmented or semicrystalline plastic.

20. The data carrier as claimed in claim 13, wherein the ablated regions are visible from both sides of the data carrier.

21. The data carrier as claimed in claim 13, wherein owing to the reflection behavior of the metal layer, the image when viewed can be seen as positive or negative depending on the viewing angle.

22. The method claimed in claim 10, wherein the opaque plastic layer is at least 50 micrometers thick.

23. The data carrier as claimed in claim 13, the metal layer is thinner than 1 micrometer.

24. The data carrier as claimed in claim 13, wherein in the case of two metal layers, they are at a distance from one another of at least 100 micrometers.

\* \* \* \* \*